United States Patent
Wen et al.

(10) Patent No.: US 8,778,426 B2
(45) Date of Patent: Jul. 15, 2014

(54) SELF-MAKING BREAD METHOD, BREAD MACHINE AND BREAD INGREDIENT BOX THEREOF

(75) Inventors: Chih Ming Wen, Tao yuan County (TW); Shangqian Gao, Zhangzhou (CN)

(73) Assignee: Tsann Kuen (Zhangzhou) Enterprise Co., Ltd., Zhangzhou, Fujian (CN)

( * ) Notice: Subject to any disclaimer, the term of this patent is extended or adjusted under 35 U.S.C. 154(b) by 105 days.

(21) Appl. No.: 12/860,221

(22) Filed: Aug. 20, 2010

(65) Prior Publication Data

US 2011/0195162 A1    Aug. 11, 2011

(30) Foreign Application Priority Data

Feb. 5, 2010    (CN) .......................... 2010 1 0301285

(51) Int. Cl.
*B65D 81/32*    (2006.01)
(52) U.S. Cl.
USPC .......................... 426/115; 426/120; 426/128
(58) Field of Classification Search
CPC ...... A21C 1/142; A21C 1/1425; A21C 1/144; B65D 17/00; B65D 47/36; B65D 51/002; B65D 81/3261; B65D 83/0094; B65D 83/06
USPC .................. 426/106, 112, 115, 119, 120, 128
See application file for complete search history.

(56) References Cited

U.S. PATENT DOCUMENTS

| | | | | |
|---|---|---|---|---|
| 2,705,579 A | * | 4/1955 | Mason | 222/107 |
| 2,834,686 A | * | 5/1958 | Reuman | 426/129 |
| 3,099,567 A | * | 7/1963 | Wallace et al. | 426/109 |
| 3,410,697 A | * | 11/1968 | Stephenson | 426/114 |
| 4,069,348 A | * | 1/1978 | Bush | 426/119 |
| 4,202,465 A | * | 5/1980 | McLaren | 229/120.17 |
| 4,562,940 A | * | 1/1986 | Asphar | 222/88 |
| 4,803,086 A | * | 2/1989 | Hedenberg | 426/87 |
| 4,874,618 A | | 10/1989 | Seaborne et al. | |
| 5,042,652 A | * | 8/1991 | Grindrod | 229/164.1 |
| 5,656,311 A | * | 8/1997 | Fond | 426/84 |
| 6,093,430 A | * | 7/2000 | Gupta | 426/115 |
| 6,119,862 A | * | 9/2000 | Childress | 206/557 |
| 6,217,924 B1 | * | 4/2001 | Sit et al. | 426/233 |
| 6,294,209 B1 | * | 9/2001 | Andersson | 426/115 |
| 6,401,599 B1 | | 6/2002 | Maeda et al. | |

(Continued)

FOREIGN PATENT DOCUMENTS

| | | |
|---|---|---|
| CN | 2303806 | 1/1999 |
| CN | 1364436 | 8/2002 |
| CN | 101631725 | 1/2010 |
| WO | WO2009/090201 | 7/2009 |

*Primary Examiner* — Drew E Becker
(74) *Attorney, Agent, or Firm* — Rabin & Berdo, P.C.

(57) ABSTRACT

The self-making bread method includes: weighing a certain amount of ingredients according to a bread recipe and placing them in a bread ingredient box; putting the bread ingredient box into the corresponding containing region of the top portion of the bread machine; using the jagged ring of the bottom portion of said containing region to open the thin film of the bottom portion of the bread ingredient box, so the ingredients will fall into the mixing container in the bread machine; controlling the water delivering mechanism inside the bread machine to deliver a certain amount of water into said mixing container; starting the mixing device inside the bread machine, which mixes the ingredients into an appropriate dough; turning off the mixing device; energizing the electric heating tube in the bread machine, to bake the dough inside the mixing container into bread.

8 Claims, 10 Drawing Sheets

(56) References Cited

U.S. PATENT DOCUMENTS

| | | |
|---|---|---|
| 6,749,876 B2 * | 6/2004 | Archibald et al. .......... 426/396 |
| 6,919,097 B2 * | 7/2005 | Lamp et al. .................. 426/120 |
| 2004/0050257 A1 | 3/2004 | Lee et al. |
| 2008/0020111 A1 | 1/2008 | Park et al. |
| 2010/0247719 A1 * | 9/2010 | Everard .................. 426/120 |
| 2013/0000491 A1 | 1/2013 | Ito et al. |

* cited by examiner

SELF-MAKING BREAD METHOD, BREAD MACHINE AND BREAD INGREDIENT BOX THEREOF

FIELD OF THE INVENTION

The present invention relates to a method of making bread with bread machine, a device for making bread and a container for containing the bread ingredient.

BACKGROUND OF THE INVENTION

The existing bread machine has a housing, a side of said housing has a door opens outward; the inner space of said housing has a mixing container with an upward opening. The inside of said housing has a mixing device. The shaft of said mixing device extends into said mixing container from the bottom portion of said mixing container, the shaft of the mixing device is installed with mixing blades. An electric heating tube is inside said housing and surrounds said mixing container. In operation, the operator firstly weighs a certain amount of ingredients according to the bread ingredient; then opens the door and puts said ingredients into said mixing container, pours a certain amount of water into said mixing container. After the door is closed, starts the mixing device, then the ingredients and water inside said mixing container are mixed into an appropriate dough. After the mixing device is closed, the electric heating tube is energized and heats the dough inside said mixing container, so said dough will be baked into bread. Stopping energizing the electric heating tube, finally the operator opens the door and fetches the bread from said mixing container. However, if the operator makes mistake in determining the amount of ingredients and water, the bread will not taste good, or the bread will not be eaten, the problem of waste will occur.

SUMMARY OF THE INVENTION

The object of the present invention is to provide a method for self-making bread, it will be possible for a common operator to make a satisfactory bread; further to provide a bread machine for making bread with said method and corresponding bread ingredient box.

The technical solution of the present invention is a method for self-making bread, comprising:

Step A, weighing a certain amount of ingredients according to the bread recipe and filling them into a bread ingredient box;

Step B, after the operator obtaining said bread ingredient box, putting the bread ingredient box into the corresponding containing region of the top portion of the bread machine; using the jagged ring of the bottom portion of said containing region to open the thin film of the bottom portion of the bread ingredient box, so said ingredients will fall into the mixing container in the bread machine;

Step C, controlling the water delivering mechanism inside the bread machine to deliver a certain amount of water according to the ingredient into said mixing container;

Step D, starting the mixing device inside the bread machine, mixing the ingredients and water in said mixing container into an appropriate dough; after said mixing device is closed, energizing the electric heating tube in the bread machine, said electric heating tube heats the dough inside said mixing container, so said dough will be baked into bread;

Step E, stopping energizing said electric heating tube, opening the door and fetching the bread from said mixing container.

In a preferred embodiment, said bread ingredient box is disposed with ingredient mark, the inside of said bread machine has a microcomputer controller and an identification mechanism corresponding to the ingredient mark of the bread ingredient box; in step B, the identification mechanism inside said bread machine provides the ingredient information of the ingredient mark of said bread ingredient box inside said containing region to the microcomputer controller; in step C, said microcomputer controller automatically controls the water delivering mechanism inside said bread machine to deliver a certain amount of water into said mixing container, the amount of water is determined by the corresponding ingredient according to the ingredient information provided by said identification mechanism; in step D, said microcomputer controller controls said mixing device in the time determined by the corresponding ingredient according to the ingredient information provided by said identification mechanism, the ingredients and water inside said mixing container are mixed into an appropriated dough; said microcomputer controller automatically controls said electric heating tube to heat the dough inside said mixing container with the power supply and baking time determined by corresponding ingredient according to the ingredient information provided by said identification mechanism, so said dough will be baked into bread.

Bread machine, a side of the housing has a door opening outward; the inside of said housing has a mixing container whose opening faces upward, an electric heating tube and a mixing device; the top portion of said bread machine has a containing region corresponding to said mixing container, said containing region has an open bottom portion and contains the bread ingredient box; a jagged ring is disposed on the bottom portion of said containing region, the teeth of said jagged ring face the thin film of the bottom portion of the bread ingredient box; a water delivering mechanism is disposed inside said housing and delivers the water into said mixing container. The jagged ring is used for piercing the thin film of the bottom portion of the bread ingredient box, so the ingredients of the bread ingredient box will fall into said mixing container automatically. It will simplify the ingredient preparation of the operator. Thereby it will prevent mistake of the operator to wrongly prepare the amount of the ingredients and water.

The top portion of said bread machine has an outer cover corresponding to said containing region, the inner surface of said outer cover has a pressing foot to press said bread ingredient box toward said jagged ring. The pressing foot of said outer cover is used for pressing the bread ingredient box, so the jagged ring on the fixed position can pierce the downward moving thin film of the bottom portion of the bread ingredient box, so the ingredients will automatically fall.

Alternatively, the top portion of said bread machine has an outer cover corresponding to said containing region, the inner surface of said outer cover has a pressing foot to press said bread ingredient box toward the edge of said containing region; an electromagnet is disposed on the top portion of said bread machine, a retaining shelf which extends into said containing region is driven by said electromagnet to support said jagged ring for piercing the thin film of the bottom portion of said bread ingredient box. The pressing foot of the outer cover fastens the bread ingredient box, so the upward moving jagged ring can pierce the thin film of the bottom portion of the bread ingredient box, so the ingredients will automatically fall.

In a preferred embodiment, said bread machine has a microcomputer controller controlling said mixing device, water delivering mechanism and electric heating tube; the inside of said housing has an identification mechanism, said identification mechanism automatically identifies the ingredient mark of said bread ingredient box inside said containing region and provides the ingredient information to said microcomputer controller, said ingredient information corresponds to said ingredient mark. By automatically identifying the ingredient mark of the bread ingredient box, the microcomputer controller can control the mixing device, the water delivering mechanism and the electric heating tube to automatically fulfill the bread making operation according to the ingredient.

In a preferred embodiment, a cleaning box is disposed in said containing region, which has an open bottom portion and contains said bread ingredient box, said jagged ring is disposed on the bottom portion of said cleaning box, so it will be convenient to take out the jagged ring for cleaning.

The bread ingredient box, which has closed hard side wall, the bottom end of said side wall is sealed with a thin film, the inside of the box is filled with ingredients, the top portion is closed with a hard top plate.

In a preferred embodiment, the bottom end of said side wall draws inward. After the thin film of the bottom end of the side wall is pierced, the inward inclining side wall is convenient for the ingredients to fall automatically.

Further, a side of the inside of said side wall has an insulation plate, said insulation plate divides the inside of said side wall into a larger region and a smaller region, the ingredients are filled in said larger region; the fruits and nuts are filled in the smaller region, so the fruits and nuts are prevented from affecting the storage of the ingredients.

Especially, the shape of said insulation plate is an inverted V character. Said insulation plate cooperates with the side wall, the inward inclining design of said insulation plate is convenient for the ingredients, fruits and nuts fall automatically.

In a preferred embodiment, the thin film of said side wall, top plate or the bottom portion is disposed with ingredient mark. It will be convenient for identifying the ingredient of the present bread ingredient box during operation.

The method of self-making bread of the present invention, it fills the ingredients of different bread ingredients into different bread ingredient boxes by the factory, after the common operator obtains the needed bread ingredient box, then the bread ingredient box is put into the bread machine, the ingredients of the bread ingredient box are automatically added into the mixing container with the bread machine, the water is added for mixing them into an appropriate dough, the electric heating tube heats the dough in the mixing container, so said dough is baked into a bread. The present method greatly simplifies the manual operation in the self-making process, it will avoids wrongly estimating the amount of ingredients caused by the negligence of the operator, so the bread will be delicious and it will avoid waste. The ingredient identification is disposed on the bread ingredient box, and the inside of the bread machine is disposed with a microcomputer controller and an identification mechanism for identifying the ingredient mark of the bread ingredient box; said identification mechanism provides the ingredient information of applied bread ingredient box to the microcomputer controller; the microcomputer controller automatically controls the water delivering mechanism inside of the bread machine according to said ingredient information, said water delivering mechanism is controlled to deliver a certain amount of water into the mixing container; then the microcomputer controller automatically controls the mixing machine according to said ingredient information, so the ingredients and water inside the mixing container are mixed into an appropriate dough; then the microcomputer controller automatically controls the electric heating tube according to said ingredient information, so the dough in the mixing container is heated and baked into bread by the electric heating tube. Thereby the bread machine can automatically make bread with different ingredients. The common operator only needs to choose the bread ingredient suitable for his own favor, then the satisfactory bread will be made. The bread machine of the present invention only adds the containing region with an open bottom portion, jagged ring and water delivering mechanism on the basis of the existing bread machine, so it will greatly simplify a lot of much manual operations, it will be possible for a common operator to make an ideal bread. Its additional structure is simple, the additional cost is low and easy to be popularized. The bread ingredient box of the present invention is convenient to provide a large amount of industrial, standard and various kinds of bread ingredients for the common operator. Its structure is simple and it is convenient for transportation and application.

DETAILED DESCRIPTION OF THE EMBODIMENTS

Embodiment 1

Figure 1:
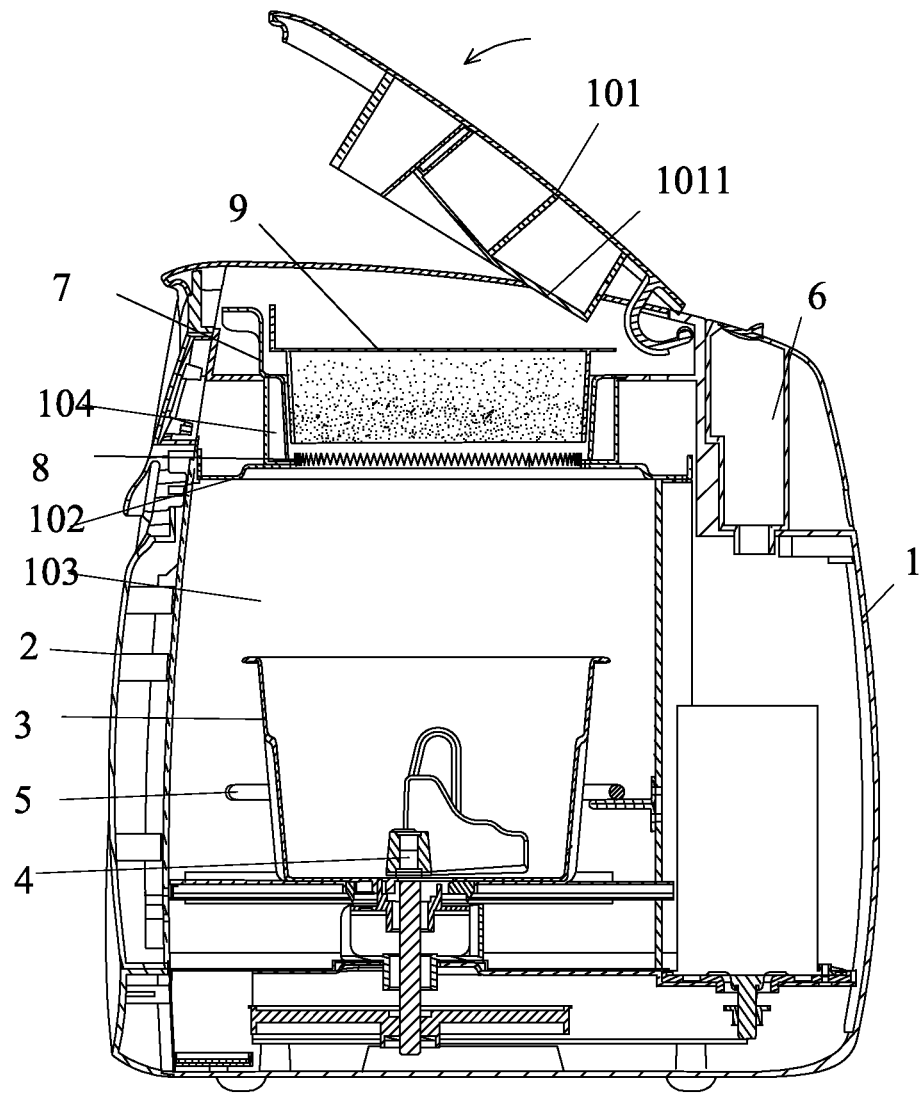
FIG. 1 is the sectional structural view of the bread ingredient box being put into the bread machine of the present invention.
Figure 2:
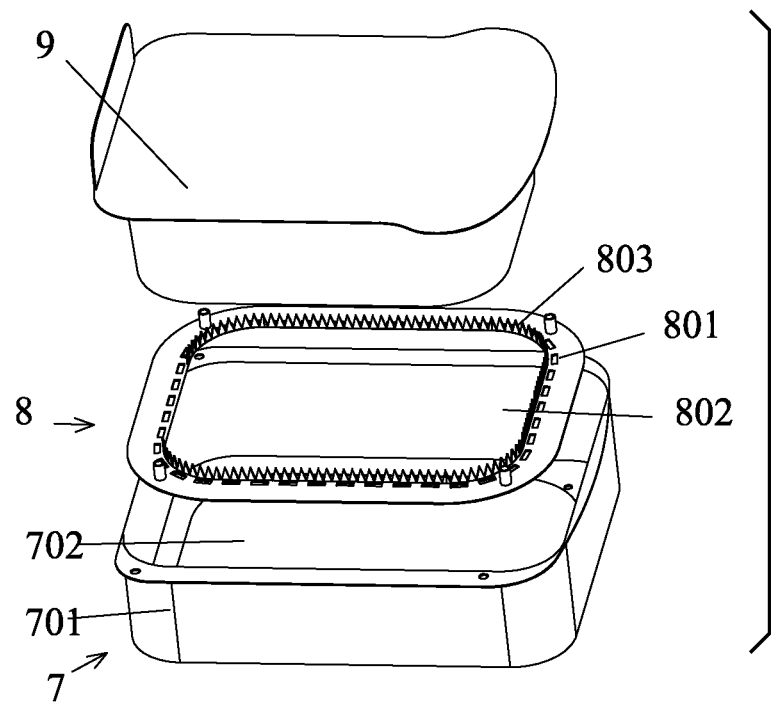
FIG. 2 is the perspective structural view of jagged ring and the cleaning box.
Figure 3:
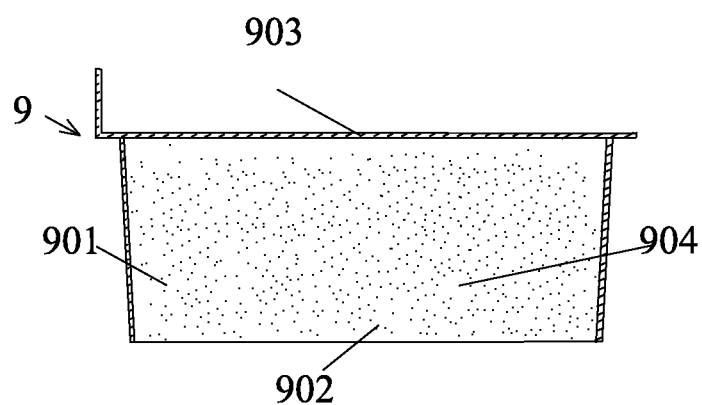
FIG. 3 is the sectional structural view of the bread ingredient box.

The structure of the bread ingredient and the bread machines of an embodiment are showed in FIG. 1 to FIG. 3.

Please refer to FIG. 1: the bread machine of the present embodiment has a housing 1 with an open front side and an open top portion. The front side of the housing 1 has a door 2 opening outward. The open top portion of the housing 1 has an outer cover 101 opening upward. The inner surface of the outer cover 101 has a pressing foot 1011. The top of the inside of the housing 1 has a transverse insulation plate 102. Said transverse insulation plate 102 divides the inner space of the housing 1 into a working region 103 whose side surface straightly opposite the door 2 and a containing region 104 whose top end straightly opposite the outer cover 101.

The working region 103 has a mixing container 3 with an upward opening. The bottom portion of the working region 103 has a mixing device 4. The shaft of the mixing device 4 stretches into the mixing container 3 from the bottom of the mixing container 3, the top end of said shaft is installed with mixing blades. The lower portion of the working region 103 in the housing 1 surrounds the working region 103 and an electric heating tube 5 is disposed therein.

The transverse insulation plate 102 has an opening corresponding to the mixing container 3, so the bottom portion of the containing region 104 has an ingredient opening. The inside of the containing region 104 has a rectangular cleaning box 7. Please refer to FIG. 2, the main body 701 of the cleaning box 7 is a box with an upward opening, the bottom portion of the main body 701 has an opening 702 corresponding to the opening of the transverse insulation plate 102. The bottom portion of the main body 701 has a jagged ring 8, the bottom plate 801 of the jagged ring 8 is rectangular and has a rectangular opening 802 corresponding to the bottom portion of the bread ingredient box 9, the two long sides and a short side along said opening 802 are continuously disposed with a row of upward extending sharp teeth 803. The bread ingredient box 9 is in the cleaning box 7. The teeth 803 of the jagged ring 8 face the thin film 902 of the bottom portion of the bread ingredient box 9. The water delivering mechanism 6 is disposed inside the housing 1 and behind the containing region 104. The water delivering mechanism 6 delivers the water into the mixing container 3 inside the working region 103.

Please refer to FIG. 2 and FIG. 3: the bread ingredient box 9 has a closed rectangular side wall 901, the bottom end of the side wall 901 draws inward and forms an inverted trapezoidal structure. The top portion of said side wall 901 is closed by the top plate 903. The ingredients weighed by the factory according to the bread ingredients are filled in the inverted bread ingredient box 9, that is an inner space 904 formed by the side wall 901 and the top plate 903, then the bottom end of said side wall 901 is closed with the thin film 902.

The side wall 901 and the top plate 903 of the bread ingredient box 9 can be made of hard oiled board or metal board. The thin film 902 can be made of aluminum foil or other papers which can resist high temperature. The flavors in the bread ingredient box 9 are salt, sugar and spice, and so on. In another embodiment of the bread ingredient box, the side wall 901 can be a closed round structure, closed oval structure or closed polygon structure. Of course, correspondingly, the cleaning box 7 and the jagged ring 8 of the bread machine can be round, oval or polygon.

Figure 4:
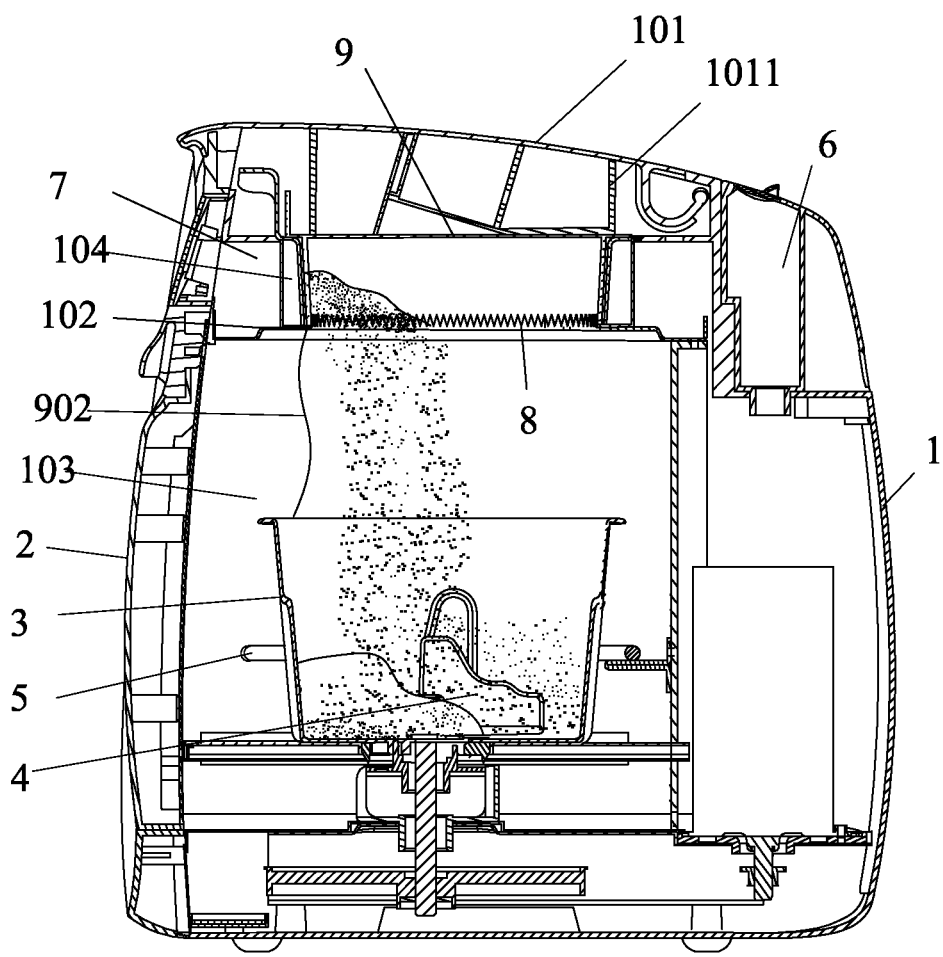
FIG. 4 is the sectional structural view of the bread ingredient box when it is pierced by the jagged ring.
Figure 5:
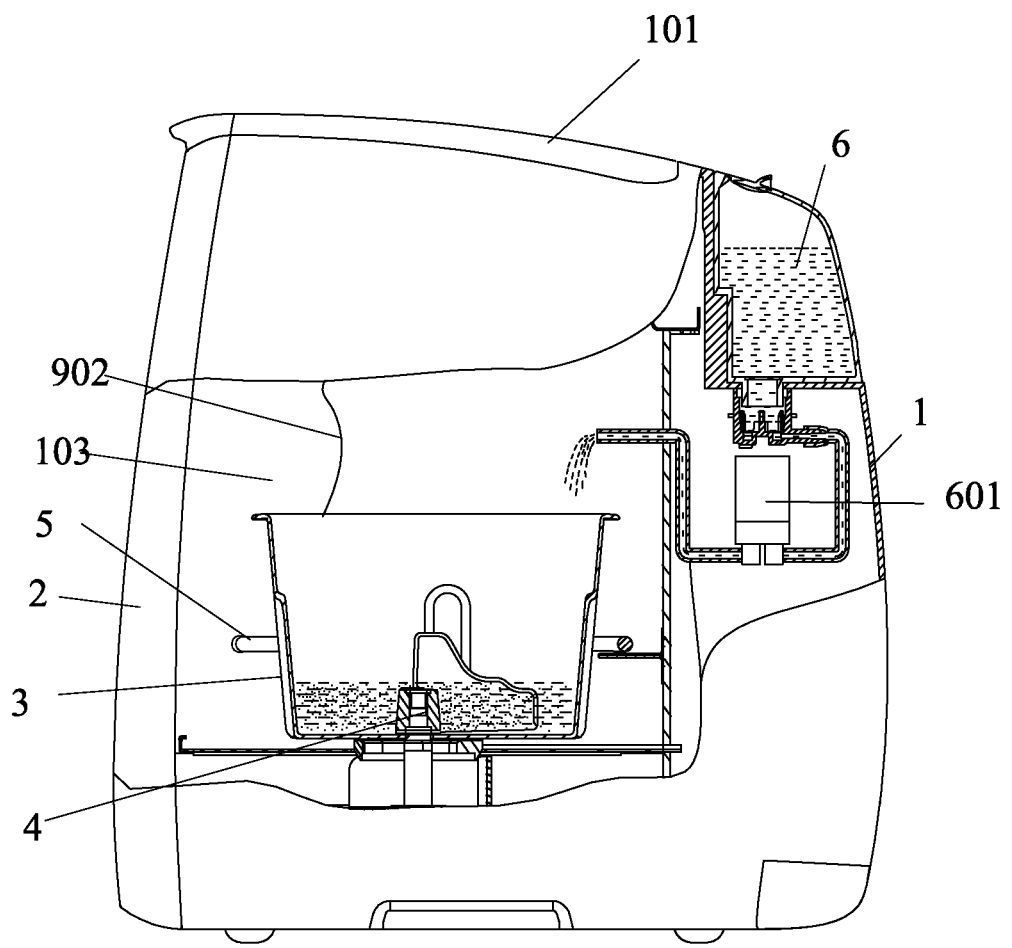
FIG. 5 is the sectional structural view of the bread machine when the water is added.

The process of self-making bread by the above bread machine are showed in FIG. 1, FIG. 4 and FIG. 5.

Please refer to FIG. 1, after the operator obtains the bread ingredient box 9, please refer to FIG. 1: firstly the operator opens the outer cover 101 of the top portion of the housing 1 of the bread machine, the bread ingredient box 9 is put into the cleaning box 7 of the containing region 04 of the housing 1.

Then the operator closes the outer cover 101 of the top portion of the housing 1 of the bread machine, please refer to FIG. 4: the pressing foot 1011 of the outer cover 101 presses the bread ingredient 9 toward the jagged ring 8 of the bottom portion of the cleaning box 7 inside the containing region 104. The teeth 803 of the jagged ring 8 are arranged as U character shape, the teeth 803 pierce the thin film 902 of the bottom portion of the bread ingredient box 9, then the ingredients of the inner space 904 of the bread ingredient box 9 push the pierced thin film 902 due to their own weight, so the pierced thin film of tongue shape hangs down, finally the ingredients fall into the mixing container 3 of the working region 103 inside the housing 1.

The operator operates the water pump switch on the operation panel of the bread machine by hand. Please refer to FIG. 5: according to the water amount determined by the ingredient of the bread ingredient box 9, the water pump 601 of the water delivering mechanism 6 inside the bread machine is controlled to deliver the corresponding amount of water into the mixing container 3.

The operator operates the mixing switch on the operation panel of the bread machine by hand. Starting the mixing device 4 inside the housing 1, then the ingredients in the mixing container 3 are mixed into an appropriate dough.

According to the mixing time determined by the ingredient of the bread ingredient box 9, after the operator operates the mixing switch to close the mixing device 4, then operates the heating switch according to the heating time and power-supply determined by the ingredient of the bread ingredient box 9, the electric heating tube 5 in the working region 103 is energized, then the electric heating tube 5 heats the dough in the mixing container 3, so said dough is baked into bread.

Then the operator operates the heating switch and stops energizing the electric heating tube 5, opens the door 2 to fetch the bread from the mixing container.

Opens the outer cover 101 and fetches the cleaning box 7, jagged ring 8 and the unsealed bread ingredient box 9 from the containing region 104 of the housing 1. Discards the unsealed bread ingredient box 9, then washes the cleaning box 7 and the jagged ring 8 to clean away the remnant ingredients, then puts the cleaning box 7 and the jagged ring 8 back into the containing region 104 of the housing 1 to prepare for the next operation.

As an improvement of the bread machine of the present embodiment, the bread machine of another embodiment has a microcomputer controller. The operator can input the code of the bread ingredient of the selected bread ingredient box 9 on the operation panel of said bread machine by hand, so the microcomputer controller of the bread machine will automatically extract the control process of the internal memory corresponding to the bread ingredient. After the outer cover is closed, the ingredients in the bread ingredient box 9 will fall into the mixing container 3. The microcomputer controller of said bread machine automatically controls the water delivering mechanism inside said bread machine according to the water amount determined by the corresponding ingredient, then the corresponding amount of water is delivered into the mixing container 3 by the water delivering mechanism; then the microcomputer controller of said bread machine automatically controls the mixing device 4 according to the mixing time determined by the corresponding ingredient, the ingredients and the water in the mixing device 4 are mixed into an appropriate dough; then the microcomputer controller of said bread machine automatically controls the electric heating tube 5 according to the power-supply and the baking time determined by the corresponding ingredient, the dough in the mixing container 3 is heated by the electric heating tube, so said dough is baked into bread.

Embodiment 2

Figure 6:
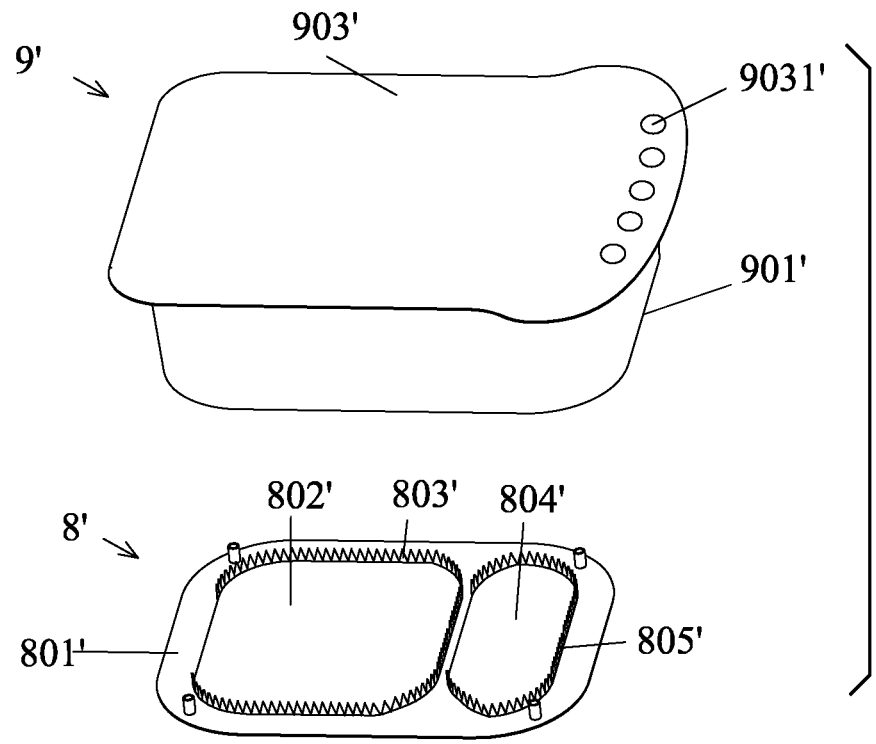
FIG. 6 is the perspective structural view of the bread ingredient box of another embodiment corresponds to the jagged ring.
Figure 7:
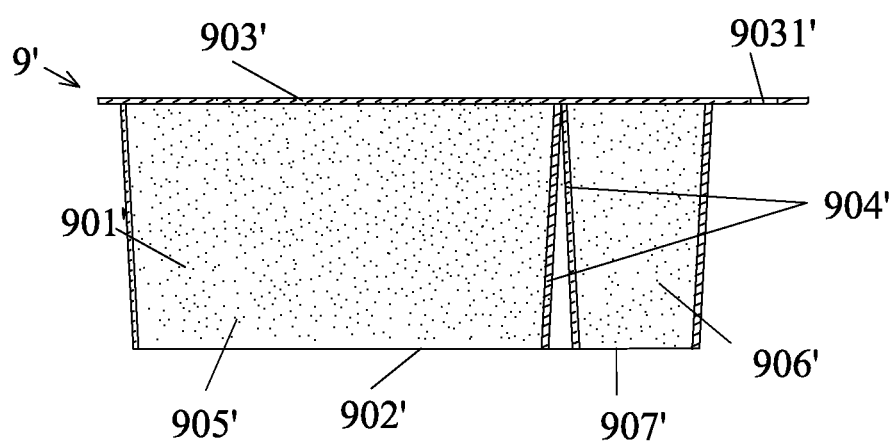
FIG. 7 is the sectional structural view of the bread ingredient box of FIG. 6.

The bread ingredient box of another embodiment of the present invention and the corresponding structure of jagged ring are showed in FIG. 6 and FIG. 7.

The bread ingredient box 9' has a closed rectangular side wall 901', the bottom end of the side wall 901' draws inward and forms an inverted trapezoidal structure. The top portion of said side wall 901' is sealed with a top plate 903'. The edge of a side of the top plate has ingredient mark of the present bread ingredient box 9' has a row of code holes 9031'. A side in the side wall 901' has an insulation plate 904' of inverted V character shape, said insulation plate 904' divides the inside of the side wall 901' into two regions 905',906' which are larger and smaller. The ingredients weighed by the factory according to the bread ingredient are filled in the larger region 905' of the bread ingredient box 9', the larger region 905' is formed by the surrounding of the side wall 901', top plate 903' and the insulation plate 904'; and the corresponding amount of fruits and nuts are weighed and filled into the smaller region 906' of the bread ingredient box 9', the smaller region 906' is formed by the surrounding of the side wall 901', top plate 903' and the insulation plate 904'. Then the thin film is sealed on the bottom end of said side wall 901'. The thin film 902' is sealed on the portion 907' of the smaller region 906', it will be especially described in the following description.

The side wall 901', top plate 903' and the insulation plate 904' of the bread ingredient box 9' can be hard oiled board or metal board. The thin film 902 can be made of aluminum foil or other papers which can resist high temperature. The flavors in the bread ingredient box 9' are salt, sugar and spice, and so on, the fruits and nuts can be walnut kernel, raisin and almond, and so on.

The bottom plate 801' of the jagged ring 8' is rectangular, which has a rectangular opening 802' corresponding to the bottom portion of the larger region 905' of the bread ingredient box 9', and has an oval opening 804' corresponding to the bottom portion of the smaller region 906' of the bread ingredient box 9'. The two long sides along the rectangular opening 802' and a short side close to the oval opening 804' are continuously disposed with a row of upward extending sharp teeth 803'; the two arc sides along the oval opening 804' and a straight side close to the outer side are continuously disposed with a row of upward extending sharp teeth 805'.

In the bread ingredient box of another embodiments, the structure of the side wall 901' can be a closed round, closed oval or closed polygon shape. Of course, the structure of the jagged ring 8' of the bread machine can also be the corresponding round, oval or polygon shape.

Figure 8:
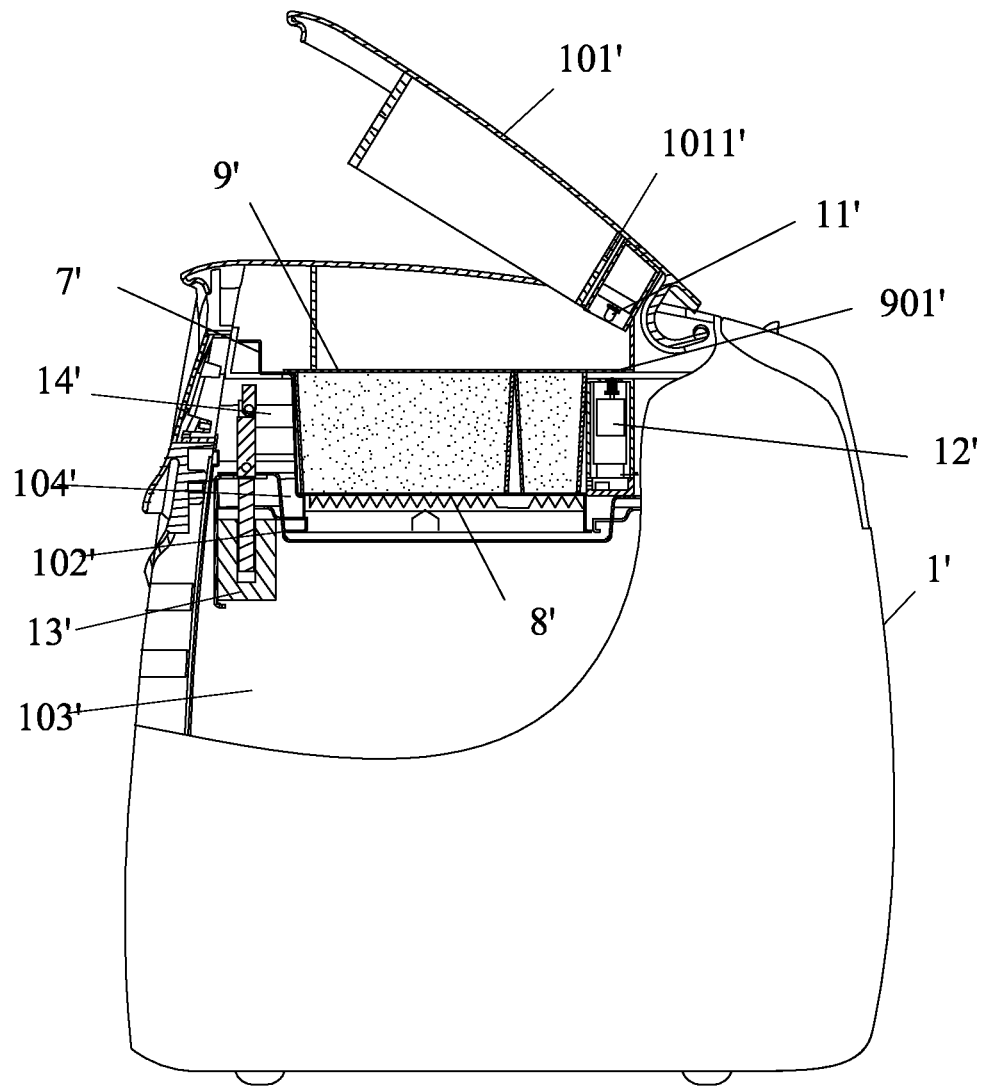
FIG. 8 is the sectional structural view of FIG. 6 when the bread ingredient box is put into the bread machine of another embodiment of the present invention.

Please refer to FIG. 8: the bread machine of the present invention has a microcomputer controller and a housing 1' with an open front side and an open top portion. The opening of the front side of the housing 1' has an outward opening door 2'. The opening of the top portion of the housing 1' has an upward opening outer cover 101'. The inner surface of the outer cover 101' has a pressing foot 1011'. The top portion inside the housing 1' has a transverse insulation plate 102'. The transverse insulation plate 102' divides the inner space of the housing 1' into a working region 103' whose side surface straightly opposite the door 2' and a containing region 104' whose top end straightly opposite the outer cover 101'.

The working region 103' has a mixing container 3' with an upward opening. The bottom portion of the working region 103' has a mixing device 4'. The shaft of the mixing device 4' stretches into the mixing container 3' from the bottom portion of the mixing container 3', the top end of said shaft is installed with mixing blades. The lower portion of the working region 103' in the housing 1' surrounds the working region 103' and an electric heating tube 5' is disposed therein.

The transverse insulation plate 102' has an opening corresponding to the mixing container 3', so the bottom portion of the containing region 104' has an ingredient opening.

In the housing 1', a water delivering mechanism 6' and an identification mechanism for automatically identifying the ingredient mark of the bread ingredient box 9' are disposed on the rear portion of the containing region 104'. The water delivering mechanism 6' can deliver the water into the mixing container 3' in the working region 103'. The identification mechanism is composed of a row of light emitting diodes 11' disposed on the outer cover 101' and a row of light receiving elements 12' disposed on the outer side of the containing region 104'. The position of a light emitting diode 11' corresponds to the position of a code hole 9031' on the top plate 903' of the bread ingredient box 9' and the position of a light receiving element 12'.

The front side out of the containing region 104' has an electromagnet 13'. The free end of the valve rod of the electromagnet 13' is connected to the retaining shelf 14' which stretches into the containing region 104', the jagged ring 8' is disposed on the retaining shelf 14'.

Figure 9:
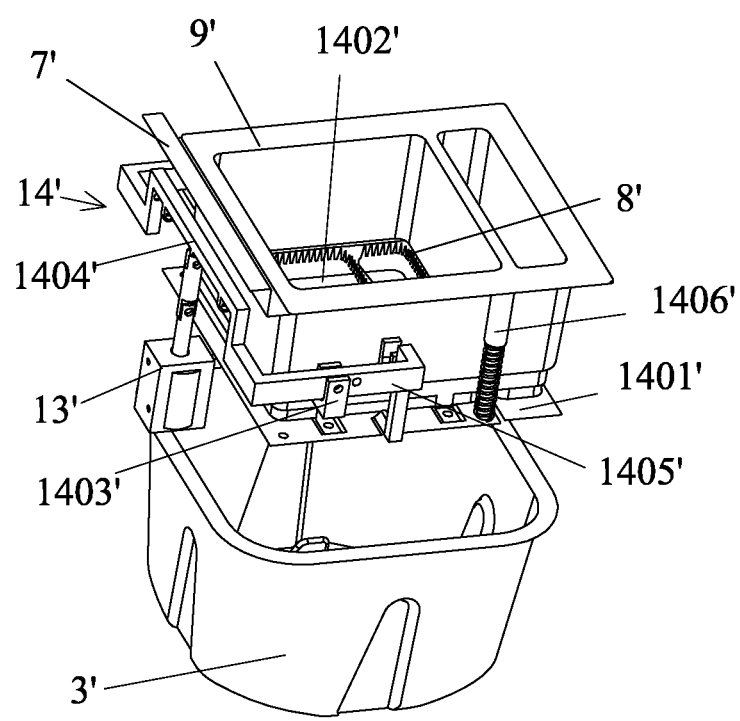
FIG. 9 is the perspective structural view of the jagged ring, electromagnet, retaining shelf and the mixing container of FIG. 8.

Please refer to FIG. 9, the bottom plate 1401' of the retaining shelf 14' has an opening 1402' corresponding to the opening of the insulation plate 102'. The two sides of the front portion of the bottom plate 1401' are respectively disposed with a supporting foot 1403', the upper end of each supporting foot 1403' is hinged with a supporting point of the middle of a lever 1405', the front end head of each lever 1405' is fixed with the corresponding end head of the arched supporting shelf 1404', the rear end head of each lever 1405' is connected to a hook head stretches inward. The two sides of the rear portion of the bottom plate 1401' are respectively disposed with a spring supporting rod 1406'. The bottom plate 1401' of the retaining shelf 14', the levers 1405' of the two sides of the supporting shelf 1404' and the two spring supporting rods 1406' are in the containing region 104'.

A rectangular cleaning box 7' is disposed upon the bottom plate 1401', that is between the space of the levers 1405' by the two sides of the supporting shelf 1404' and the two spring supporting rods 1406'. The cleaning box 7' has an opening faces upward, its bottom plate has an opening corresponding to the opening of the transverse insulation plate 102. The spring rods 1406' by the two sides of the bottom plate 1401' of the retaining shelf 14' support the edge of the cleaning box 7'. The jagged ring 8' is placed upon the bottom plate in the cleaning box 7', which is supported by the inward extending hook head of the rear end head of the levers 1405' by the two sides of the supporting shelf 1404'. If the bread ingredient box 9' is placed in the cleaning box 7', then the teeth 803' and 805' of the jagged ring 8' will face the thin film 902' of the bottom portion of the bread ingredient box 9.

The process of operating the present bread machine for self-making bread are showed in FIG. 8, FIG. 10, FIG. 11 and FIG. 12:

After the operator obtains the bread ingredient box 9', please refer to FIG. 8: firstly the operator opens the outer cover 101' of the top portion of the housing 1', then puts the bread ingredient box 9' into the cleaning box 7' inside the containing region 104' of the housing 1'. Each light emitting tube 11' on the outer cover 101' are far away from the light receiving elements 12' corresponding to the outer side of the containing region 104'.

Figure 10:
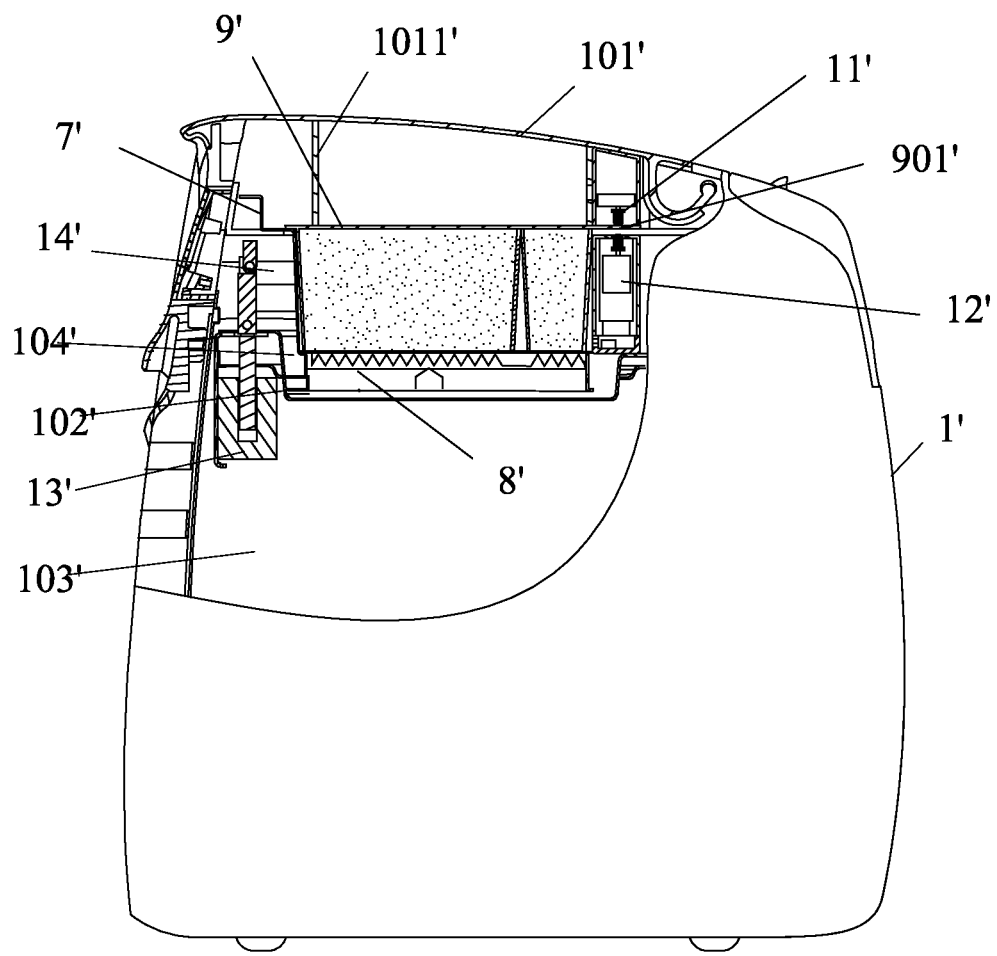
FIG. 10 is the sectional structural view of FIG. 8 when the ingredient mark is identified.

The operator closes the outer cover 101' of the top portion of the housing 1', please refer to FIG. 10: the pressing foot 1011' of the outer cover 101' presses the bread ingredient box 9' toward the edge of the cleaning box 7' in the containing region 104'. Each light emitting diode 11' on the outer cover 101' is close to the light receiving elements 12' corresponding to the outer side of the containing region 104'. Since each code hole 9031' of the bread ingredient box 9' respectively opens or closes according to the specific code, so the light receiving elements 12' beneath the open code hole 9031' will receive the light signal corresponding to the light emitting diode 11', while the light receiving elements 12' beneath the closed code hole 9031' will not receive the light signal corresponding to the light emitting diode 11'. The outputs of light receiving elements 12' are transmitted to the microcomputer controller, then the microcomputer controller will automatically identify the code of bread ingredient of said bread ingredient box 9'. The microcomputer controller will automatically extract the control process of the internal memory according to the bread ingredient.

Figure 11:
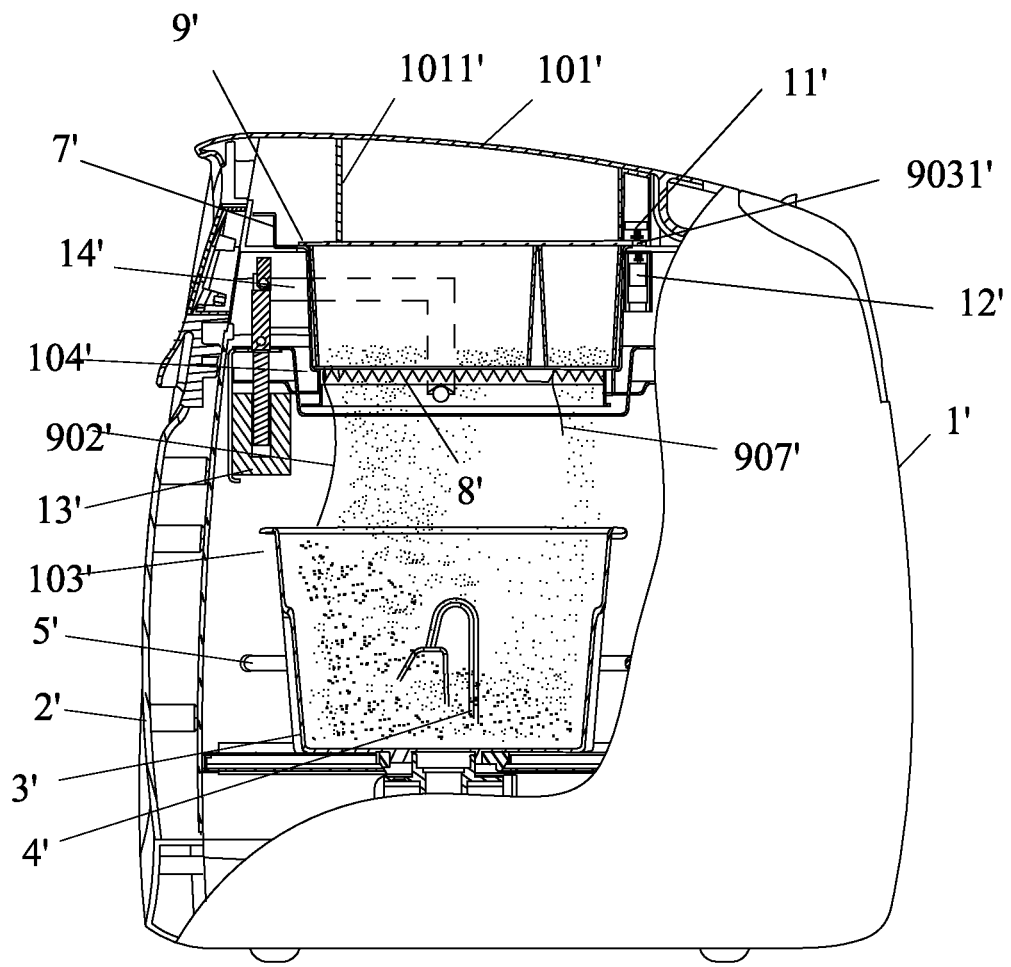
FIG. 11 is the sectional structural view of FIG. 8 when the bread ingredient box is pierced by the jagged ring.

Please refer to FIG. 11: the microcomputer controller controls the valve rod of the electromagnet 13' moves downward, so the hook heads of the free ends of the levers 1405' by the two sides of the supporting shelf 1404' of the retaining shelf 14' will upward support the jagged ring 8' of the bottom portion of the cleaning box 7'. The U character shaped teeth 803', 805' of the jagged ring 8' pierce the thin film 902' on the bottom portion of the bread ingredient box 9' and on the thin film 907' of the smaller region 906'. Then the microcomputer controller controls the valve rod of the electromagnet 13' moves upward, so the hook heads of the free ends of the levers 1405' by the two sides of the supporting shelf 1404' of the retaining shelf 14' will downward pull the jagged ring 8' of the bottom portion of the cleaning box 7', the pierced tongue shaped thin film 902', 907' are caused to move downward. The pierced tongue shaped thin film 902' hangs down due to the weight of the ingredients of the larger region 905' of the inner space of the bread ingredient box 9', the ingredients will fall into the mixing container 3' of the working region 103' in the housing 1'; the pierced tongue shaped thin film 907' hangs down due to the weight of the fruits and nuts of the smaller region 906' of the inner space of the bread ingredient box 9', then the fruits and nuts will fall into the mixing container 3' of the working region 103' in the housing 1'.

Figure 12:
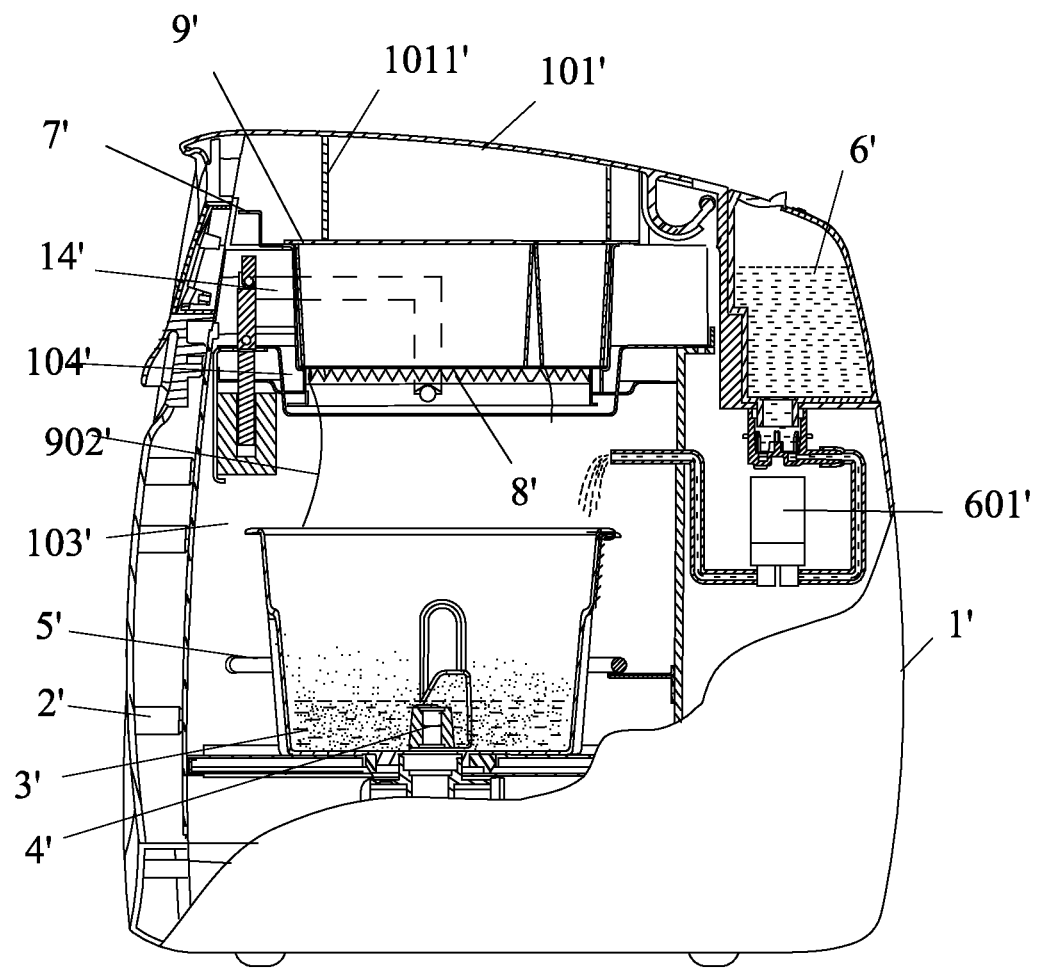
FIG. 12 is the sectional structural view of FIG. 8 when the water is added.

Please refer to FIG. 12: the microcomputer controller controls the water pump 601' of the water delivering mechanism 6' in the bread machine to deliver a certain amount of water into the mixing container 3', the water amount is determined by the bread ingredient of the bread ingredient box 9'.

The microcomputer controller automatically controls the mixing device 4' in the housing 1' according to the mixing time determined by the bread ingredient of the bread ingredient box 9', the flour, baking powder, the flavor, the fruits and nuts and water in the mixing container 3' are mixed into an appropriate dough.

The electric heating tube 5' in the working region 103' is energized by the microcomputer controller according to the heating time and power-supply determined by the bread ingredient of the bread ingredient box 9', then the electric heating tube 5' heats the dough in the mixing container 3', so said dough is baked into bread. In the baking process, the microcomputer controller controls the water pump 601' of the water delivering mechanism 6' in the bread machine to deliver a certain amount of water into the mixing container 3', so the bread is humidified, the adding time and the adding amount of water are determined by the bread ingredient of the bread ingredient box 9'.

After the above processes, the operator opens the door 2' and fetch the bread from the mixing container 3'.

The operator opens the outer cover 101', then fetches the cleaning box 7', jagged ring 8' and the unsealed bread ingredient box 9' from the containing region 104' of the housing 1'. Discards the unsealed bread ingredient box 9', washes the cleaning box 7' and the jagged ring 8' to clean away the remnant flour, baking powder and the flavor. Then puts the cleaning box 7' and the jagged ring 8' back into the containing region 104' of the housing 1' to prepare for the next operation.

Of course, in the bread ingredient box of other embodiments of the present invention, the thin film of the side wall, top plate or the bottom plate can also be disposed with bar code as the bread ingredient mark. Correspondingly, a bar code reader is disposed in the bread machine, thereby the bread ingredient of the bread ingredient box will be automatically identified.

Although the present invention has been described with reference to the preferred embodiments thereof for carrying out the invention, it is apparent to those skilled in the art that a variety of modifications and changes may be made without departing from the scope of the present invention which is intended to be defined by the appended claims.

What is claimed is:

1. A bread ingredient box comprising,
a closed hard side wall having a top end and a bottom end, the bottom end tapering inward and defining an inverted trapezoidal cross-section;
a high temperature resistant thin film sealing the bottom end of said closed hard side wall; and
a single-layer top plate sealing the top end of the closed side wall,
wherein an inside of the bread ingredient box is filled with bread ingredients,
wherein the bread ingredient box fits in a containing region of a bread machine, the containing region having a bottom portion with a jagged ring including a plurality of teeth,
wherein the closed hard side wall, the high temperature resistant thin film and the single-layer top plate define a single compartment, and
wherein the high temperature resistant thin film is adapted to be pierced by the plurality of teeth and thereby to allow the bread ingredients filled in the inside to flow downward and out of the inside of the bread ingredient box.

2. The bread ingredient box according to claim 1, wherein the bottom end of said closed hard side wall draws inward toward the inside of the bread ingredient box.

3. The bread ingredient box according to claim 1, further comprising an insulation plate,
wherein said insulation plate divides the inside of said bread ingredient box into a larger region and a smaller region,
wherein the bread ingredients are filled in the larger region and the smaller region is filled with additional ingredients for making bread.

4. The bread ingredient box according to claim 3, wherein the shape of said insulation plate is an inverted V character.

5. The bread ingredient box according to claim 1, wherein the high temperature resistant thin film, the single-layer top plate or a bottom plate is disposed with an ingredient mark identifying the ingredients.

6. The bread ingredient box according to claim 2, further comprising an insulation plate,
wherein said insulation plate divides the inside of said bread ingredient box into a larger region and a smaller region, and
wherein the ingredients are filled in the larger region and the smaller region is filled with additional ingredients for making bread.

7. The bread ingredient box according to claim 6, wherein the shape of said insulation plate is an inverted V character.

8. The bread ingredient box according to claim 2, wherein the thin film of said side wall, top plate or a bottom plate is disposed with an ingredient mark identifying the ingredients.

* * * * *